United States Patent
Ma et al.

(10) Patent No.: US 7,093,262 B2
(45) Date of Patent: Aug. 15, 2006

(54) DETECTING DEADLOCKS IN MULTITHREADED PROGRAMS

(75) Inventors: Zhiqiang Ma, Urbana, IL (US); Paul M. Petersen, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 717 days.

(21) Appl. No.: 10/207,262

(22) Filed: Jul. 30, 2002

(65) Prior Publication Data

US 2004/0025164 A1 Feb. 5, 2004

(51) Int. Cl.
*G06F 15/16* (2006.01)
(52) U.S. Cl. .................................................... 719/310
(58) Field of Classification Search ................. 719/310
See application file for complete search history.

(56) References Cited

U.S. PATENT DOCUMENTS

| | | | | |
|---|---|---|---|---|
| 5,590,335 A | * | 12/1996 | Dubourreau et al. | ........ 718/104 |
| 6,598,068 B1 | * | 7/2003 | Clark | ........................ 718/104 |
| 2002/0138544 A1 | * | 9/2002 | Long | ........................ 709/107 |

* cited by examiner

*Primary Examiner*—William Thomson
*Assistant Examiner*—LeChi Truong
(74) *Attorney, Agent, or Firm*—Michael R. Barre

(57) ABSTRACT

An arrangement is provided for detecting deadlocks in a multithreaded program. When a thread in a multithreaded program performs a resource operation related to a mutually exclusive shared resource, it creates relationships between the thread and the shared resource as well as between the thread and other threads of the multithreaded program. Such created relationships are monitored and used to detect deadlocks.

30 Claims, 12 Drawing Sheets

DETECTING DEADLOCKS IN MULTITHREADED PROGRAMS

BACKGROUND

Multithreading programming has become a common practice. Independent processing tasks may be handled in different threads that proceed in parallel to improve speed and efficiency. Different threads, however, may be synchronized whenever it is necessary. Threads in a multithreaded program may share resources such as objects. Some shared resources may be accessed only in a manner that is mutually exclusive while other resources can be shared on a non-exclusive basis.

Threads in a multithreaded program may get deadlocked if each of such threads tries to acquire one or more mutually exclusive shared resources. For example, consider a multithreaded program having a plurality of threads, including a thread T1 and a thread T2. Assume that thread T1 has acquired resource A and is waiting to acquire resource B. If at the same time, a different thread T2 has acquired resource B and is waiting to acquire resource A, thread T1 and thread T2 are deadlocked. In this case, thread T1 is deadlocked on resource B and thread T2 is deadlocked on resource A. Without detecting such a situation and resolving the deadlock, neither thread T1 nor thread T2 can proceed. As a result, the entire multithreaded program may stall.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar parts throughout the several views of the drawings, and wherein:

DETAILED DESCRIPTION

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
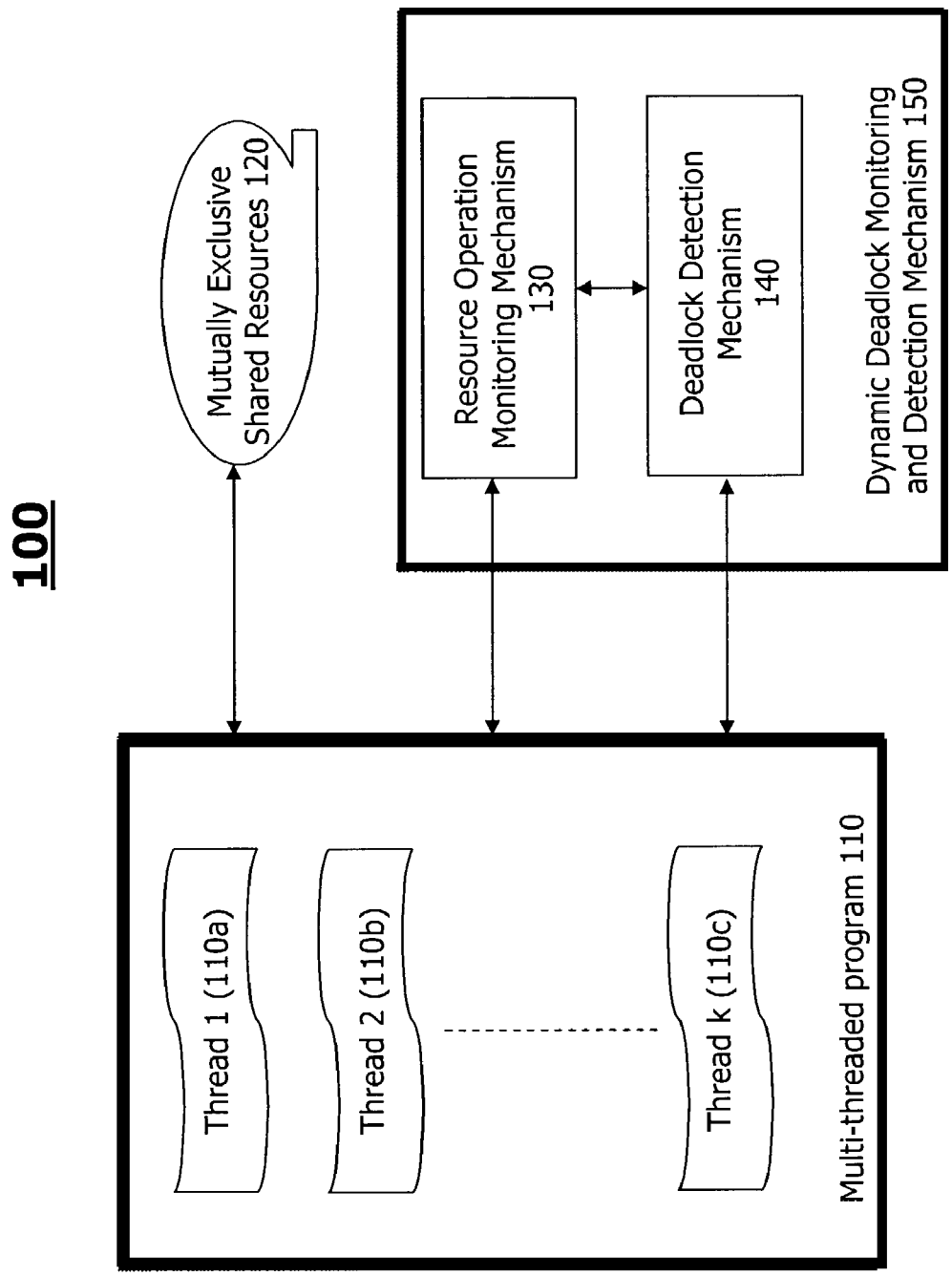
FIG. 1 depicts an exemplary framework, in which deadlocks among threads in a multithreaded program in accessing mutually exclusive shared resources are dynamically monitored and detected, according to embodiments of the present invention.

FIG. 1 depicts an exemplary framework 100, in which deadlocks among threads in a multithreaded program in accessing mutually exclusive shared resources are dynamically monitored and detected, according to embodiments of the present invention. The framework 100 includes a multithreaded program 110 containing a plurality of threads (thread 1 110a, thread 2 110b, . . . , thread k 110c), a set of mutually exclusive shared resources 120, and a dynamic deadlock monitoring and detection mechanism 150. The threads of the multithreaded program 110 may execute concurrently and may independently and exclusively access the shared resources 120. To detect deadlock situations, the dynamic deadlock monitoring and detection mechanism 150 may observe the operations performed by the threads with respect to the shared resources 120 and determine whether deadlocks exist.

The mutually exclusive shared resources 120 may include, but are not limited to, synchronization objects such as critical sections, mutex locks, writer locks or threads. A mutually exclusive shared resource may be accessed by one thread at any time instance. If a thread requests to access a shared resource that is already acquired by another thread, the requesting thread may have to wait until the thread that is using the shared resource releases the resource.

Figure 2:
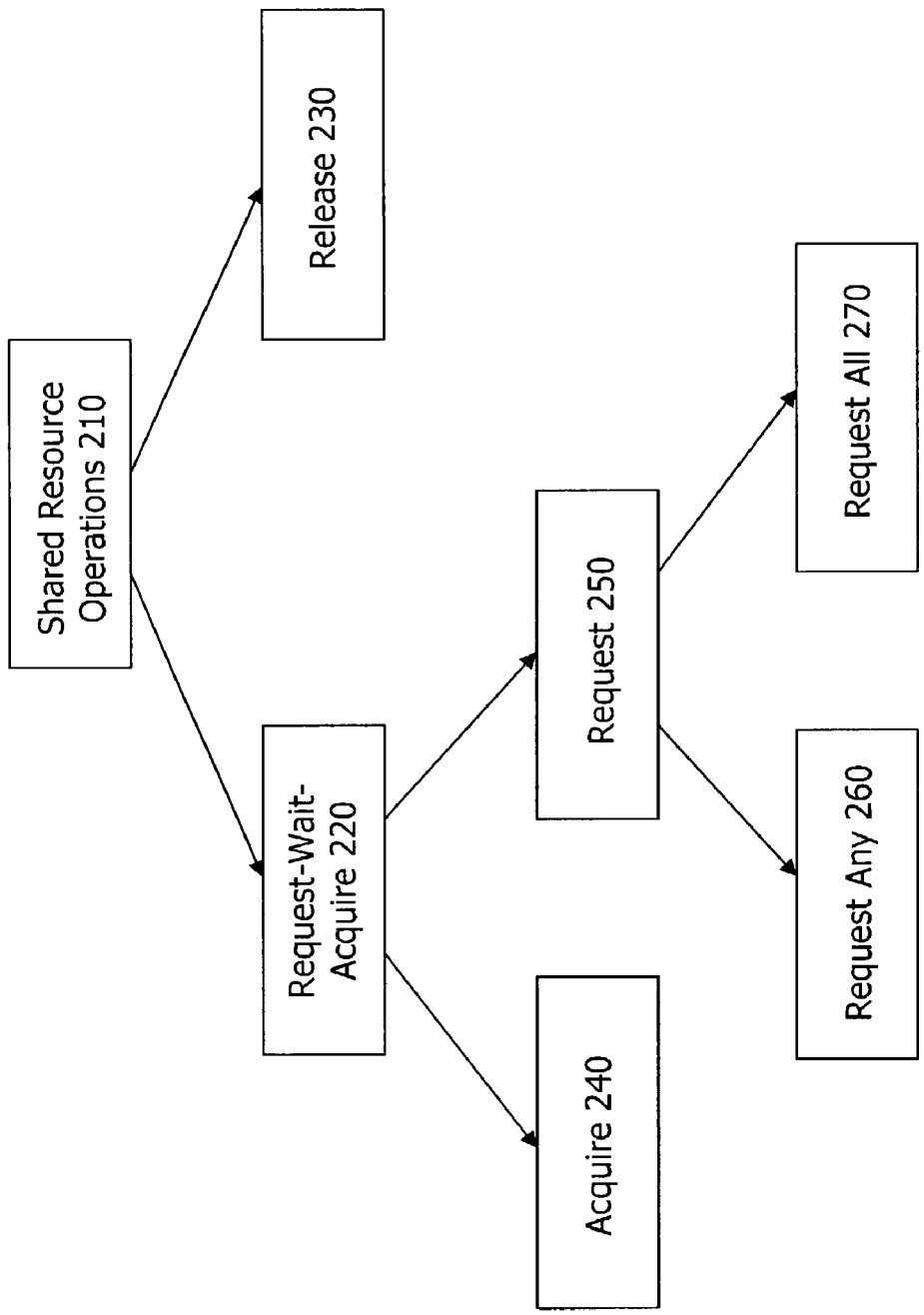
FIG. 2 describes exemplary types of resource operations, according to embodiments of the present invention.

A thread may access shared resources via resource operations. FIG. 2 describes exemplary types of resource operations, according to embodiments of the present invention. A shared resource operation 210 may include, but may not be limited to, a category of request-wait-acquire operation 220 and a release operation 230. The release operation 230 is normally performed by a thread that has acquired and used a shared resource and is ready to relinquish the resource. An acquired resource is no longer available to other threads until it is released via the release operation 230. Through a release operation, the released resource becomes available to other threads. Within the category of request-wait-acquire operation 220, the resource operation may be further classified into acquire operation 240 and request operation 250. A thread may perform the acquire operation 240 to grab an available shared resource or resources.

The request operation 250 may be further divided into request-any operation 260 and request-all operation 270. A thread may request one or more shared resources through either a request-any operation or a request-all operation. When a thread requests more than one resource via a request-any operation, the thread may proceed to acquire when any of the requested shared resources becomes available. When a thread requests more than one shared resources via a request-all operation, the thread may not proceed to acquire until all the requested resources become available.

To detect deadlock situations, the dynamic deadlock monitoring and detection mechanism 150 (see FIG. 1) includes a resource operation monitoring mechanism 130 that monitors the types of the resource operations performed and a deadlock detection mechanism 140 that reacts to such monitored resource operations to detect possible deadlocks.

The resource operation monitoring mechanism 130 observes the resource operations performed by the threads (e.g., thread 1 110a, thread 2 110b, . . . , thread k 110c) in the multithreaded program 110 and activates the deadlock detection mechanism 140 whenever it is appropriate. A deadlock situation may arise when multiple threads request a set of shared resources. When there is no request made to access shared resource(s), there can be no deadlocks. For instance, if the resource operations performed by the threads are either acquire or release operations, there may be no need to activate the deadlock detection mechanism 140. When a thread requests a shared resource that is not available (i.e., the resource has currently been acquired by another thread), it may be appropriate to activate the deadlock detection mechanism 140 to check whether a deadlock situation exists.

Figure 3:
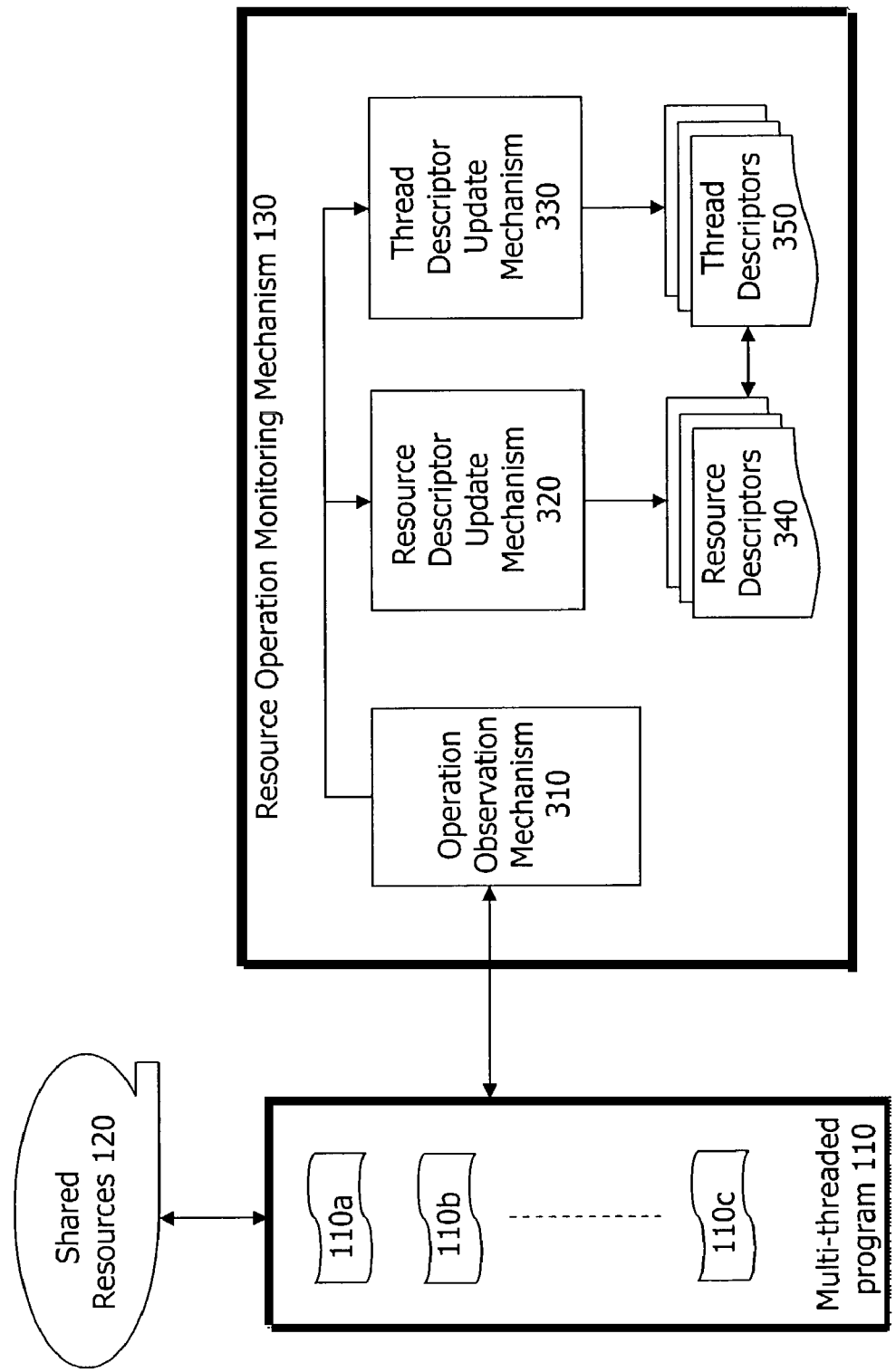
FIG. 3 depicts the internal high level block diagram of an exemplary resource operation monitoring mechanism, according to embodiments of the present invention.

FIG. 3 depicts the internal high level block diagram of an exemplary resource operation monitoring mechanism 130, according to embodiments of the present invention. The resource operation monitoring mechanism 130 comprises an operation observation mechanism 310, a resource descriptor update mechanism 320 that maintains a set of resource descriptors 340, and a thread descriptor update mechanism 330 that maintains a set of thread descriptors 350. Therefore, the resource operation monitoring mechanism 130 maintains two sets of descriptors (i.e., the resource descriptors 340 and the thread descriptors 350) with information that may be useful in assisting deadlock detection.

Each of the resource descriptors 340 corresponds to and represents an underlying shared resource and contains information related to, for example, the shared resource or links to thread descriptors that describe relationships between the underlying shared resource and various threads. For instance, a shared resource and a thread may be related via a request operation performed by the thread to access the shared resource. A different relation may be created when a thread acquires the shared resource.

Figure 4:
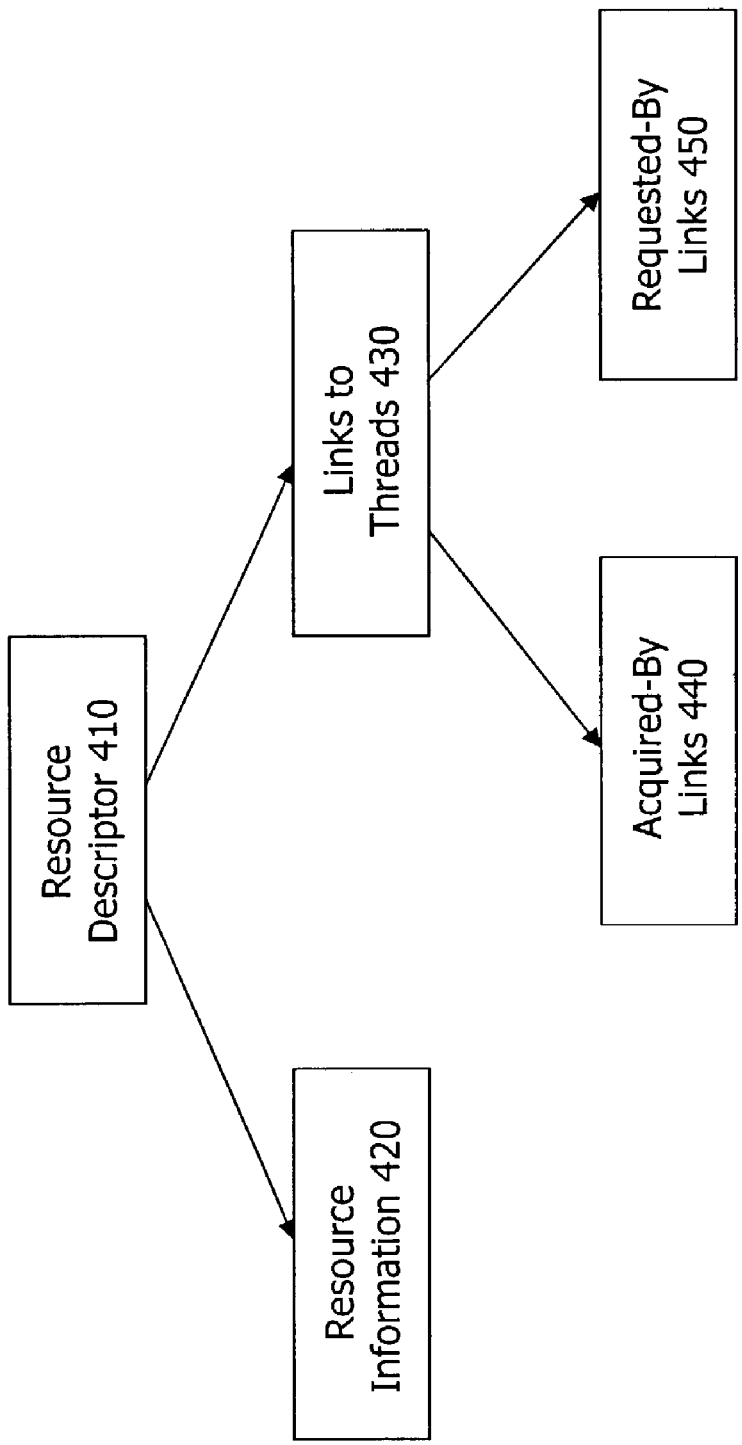
FIG. 4 describes an exemplary construct of a resource descriptor, according to embodiments of the present invention.

FIG. 4 describes an exemplary construct of a resource descriptor, according to embodiments of the present invention. As shown in FIG. 4, a resource descriptor 410 may include resource information 420 and links to threads(represented by thread descriptors) 430. Resource information 420 may include, but are not limited to, descriptions about the resource itself such as its name, identity, version, or other relevant information. The links to threads 430 may include links such as acquired-by links 440 and requested-by links 450. The acquired-by links 440 of an underlying shared resource point to thread descriptors that correspond to and represent the threads that acquired the shared resource. Similarly, the requested-by links 450 point to thread descriptors that correspond to and represent the threads that requested (but not yet acquired) to access the underlying shared resource. Through links to threads 430, it can be determined in terms of both which thread has acquired the underlying shared resource and which thread(s) may be waiting for the underlying shared resource.

Each of the thread descriptors 350 (see FIG. 3) corresponds to and represents an underlying thread and contains information related to, for example, the thread itself or links to resource descriptors reflecting the relationship between the underlying thread and various shared resources that are related to the thread. For instance, a thread and a shared resource may be related via a request operation indicating that the underlying thread has requested the shared resource. Furthermore, when the underlying thread acquires a shared resource, a different relation may be created via an acquire operation.

Figure 5:
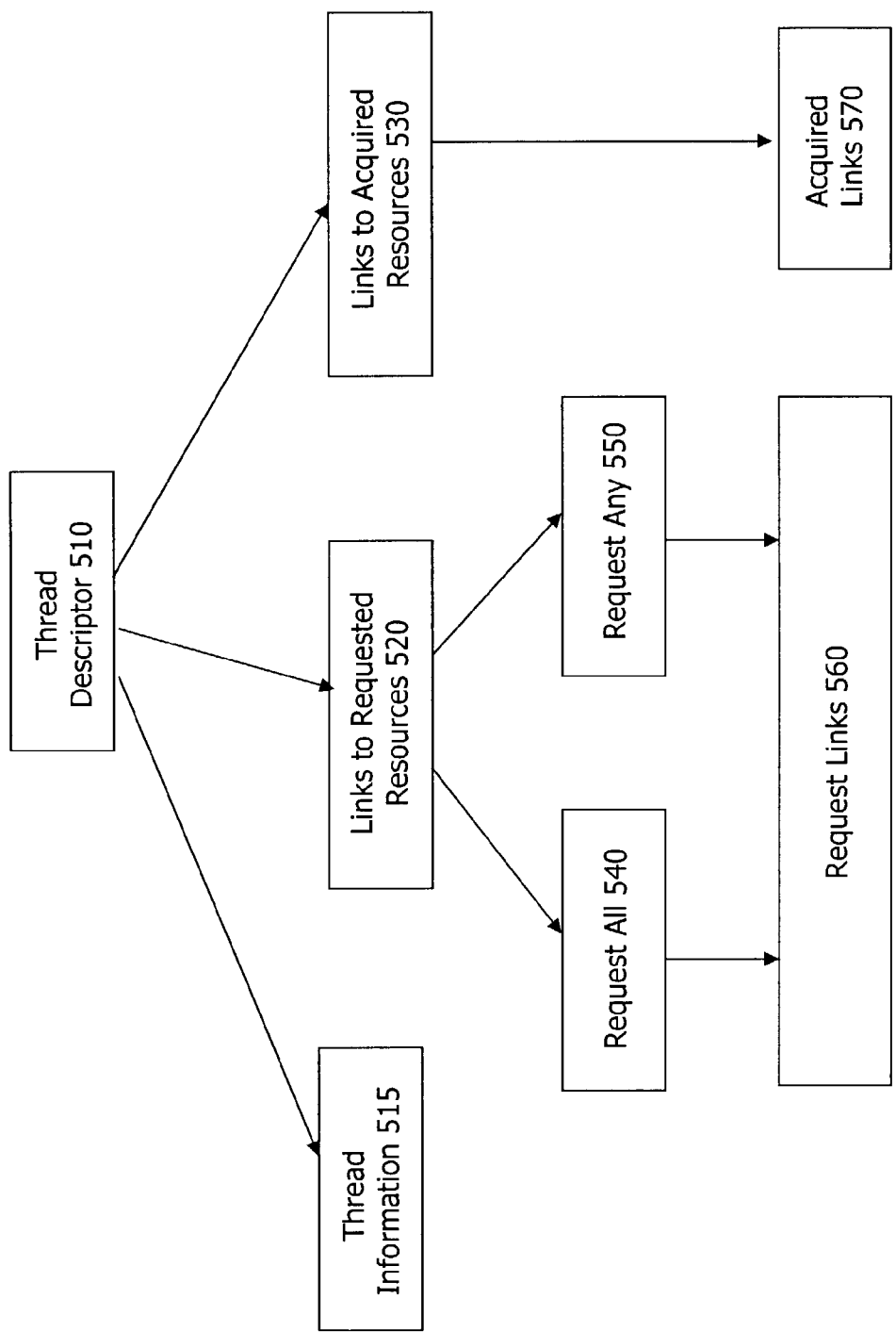
FIG. 5 describes an exemplary construct of a thread descriptor, according to embodiments of the present invention.

FIG. 5 describes an exemplary construct of a thread descriptor, according to embodiments of the present invention. A thread descriptor 510 may include, but are not limited to, thread information 515, links to requested shared resources(represented by resource descriptors) 520 and links to acquired shared resources(represented by resource descriptors) 530. Thread information 515 may include, but are not limited to, descriptions about the thread itself such as the identity of the thread. The links to acquired resources 530 may include acquired links 570, which point to resource descriptors that correspond to and represent the shared resources the underlying thread has acquired but not yet released.

Requested resources may be further classified as either request-all 540 or request-any 550. Such classification may indicate whether the shared resource(s) is(are) requested via a request-all operation, meaning that the requesting thread may wait and no acquisition of the requested shared resources may take place until all the requested resources are available, or via a request-any operation, meaning that the requesting thread may wait and no acquisition of requested resources may take place until any of the requested resources is available and that the requesting thread may acquire any requested shared resource whenever the shared resource becomes available even when other requested shared resources are not. The links to requested shared resources 520 may include request links 560. The request links 560 point to the resource descriptors that correspond to and represent the shared resources the underlying thread has requested but not yet acquired.

The resource descriptors 340 may cross-reference the thread descriptors 350 via the requested-by links 450 (pointing to the thread descriptors representing the threads that have requested but not yet acquired the shared resource) and the acquired-by links 440 (pointing to the thread descriptors representing the threads that have acquired but not yet released the shared resource). On the other hand, the thread descriptors 350 may cross-reference the resource descriptors 340 via the request links 560 (pointing to the resource descriptors representing the shared resources that the thread has requested but not yet acquired) and the acquired links 570 (pointing to the resource descriptors representing the shared resources that the thread has acquired but not released).

The resource operation observation mechanism 310 observes the operations performed by the threads (110a, 110b, . . . , 110c) and invokes the resource descriptor update mechanism 320 and the thread descriptor update mechanism 330 to dynamically update the information in the resource descriptors and thread descriptors. Such updated descriptors may then be used for deadlock detection purposes. Details about how the descriptors are updated according to different resource operations and how the descriptors are used in detecting deadlocks are discussed with reference to FIG. 8 to FIG. 11.

Figure 6:
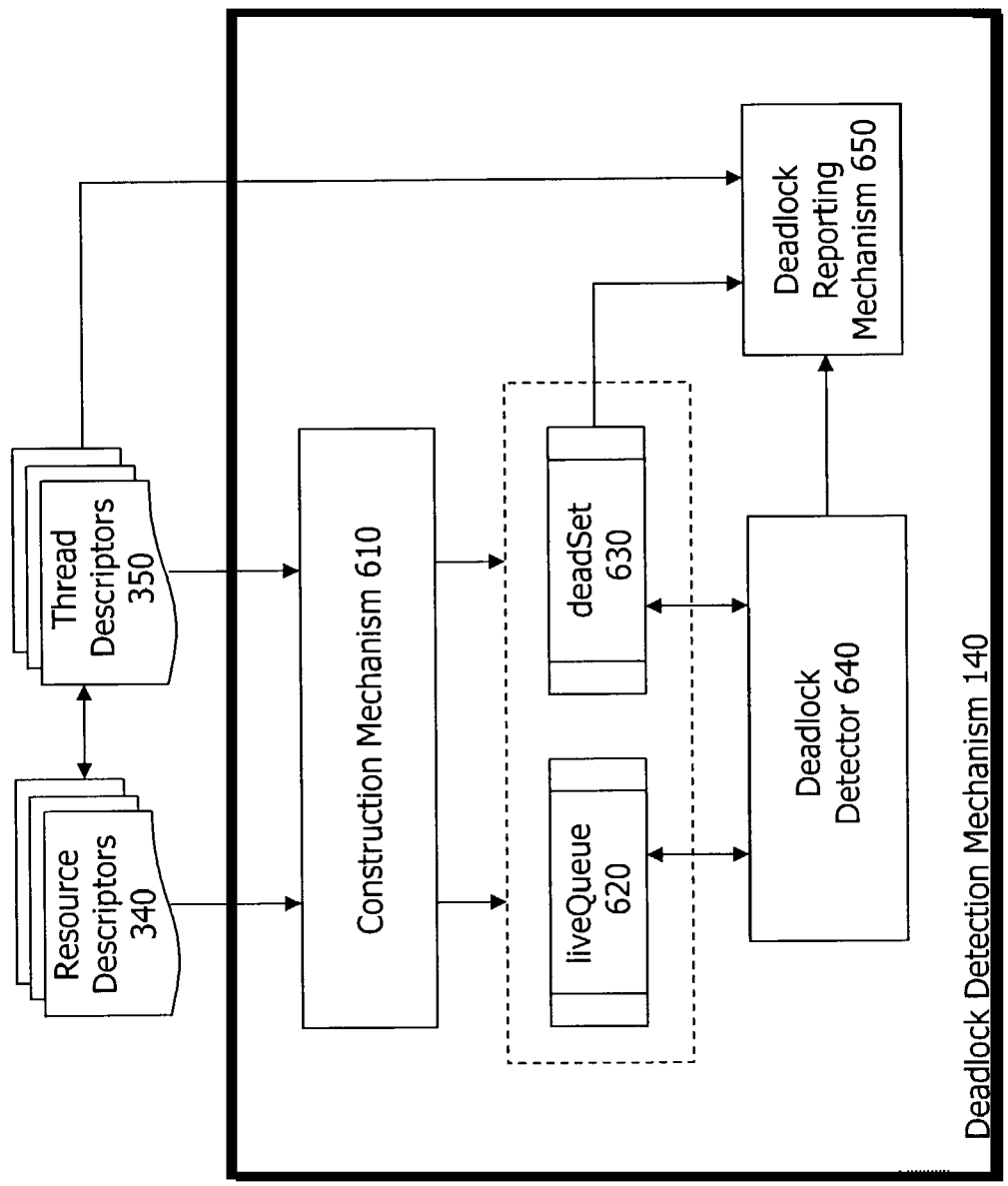
FIG. 6 depicts the internal high level block diagram of an exemplary deadlock detection mechanism, according to embodiments of the present invention.

FIG. 6 depicts the internal high level block diagram of an exemplary deadlock detection mechanism 140, according to embodiments of the present invention. The deadlock detection mechanism 140 includes a construction mechanism 610, two data sets, namely a liveQueue 620 and a deadSet 630, a deadlock detector 640, and a deadlock reporting mechanism 650. The construction mechanism 610 accesses information from the resource descriptors 340 and the thread descriptors 350 and uses such information to contruct the liveQueue 620 and the deadSet 630. The purpose of constructing the two data sets is for deadlock detection purposes. Details about how the liveQueue 620 and the deadSet 630 are constructed are described with reference to FIG. 10.

Based on the constructed liveQueue 620 and the deadSet 630, the deadlock detector 640 analyzes the information contained in the data sets and detects deadlocks based on such information. Details about how the deadlock detector 640 utilizes the information in the liveQueue 620 and the deadSet 630 to identify deadlock situations are discussed with reference to FIG. 11.

When deadlocks are detected, the deadlock detector 640 invokes the deadlock reporting mechanism 650 to report details of the deadlocks. A deadlock report may include information such as which thread is deadlocked on which shared resources. Furthermore, it may also include information such as which thread is in possession of each shared resource on which a deadlock has occurred. To report detailed information about detected deadlocks, the deadlock reporting mechanism 650 may access information in the deadSet 630 as well as the information contained in relevant thread descriptors 350. Details about deadlock reporting mechanism 650 are described with reference to FIG. 12.

Figure 7:
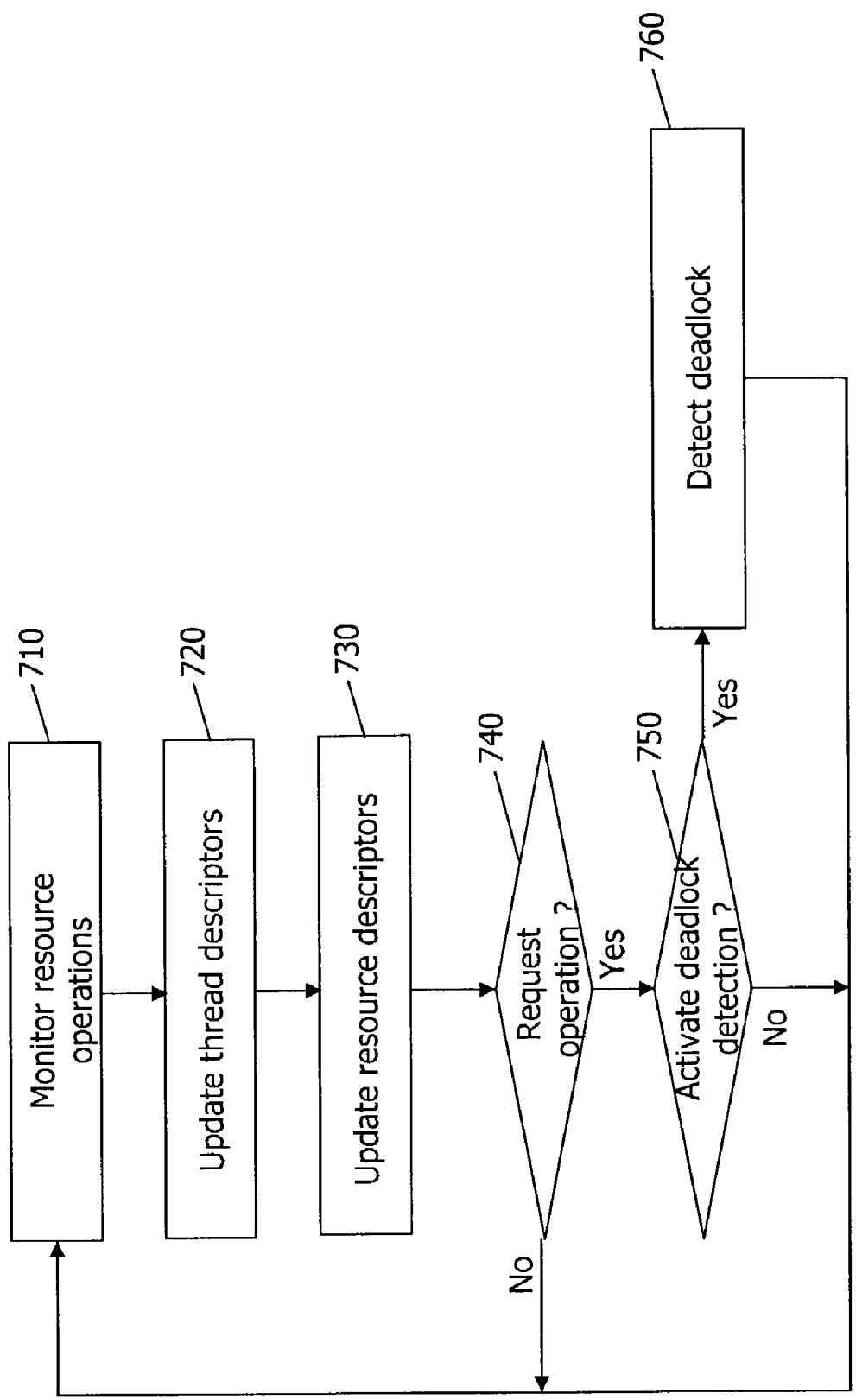
FIG. 7 is a flowchart of an exemplary process, in which deadlocks among threads in a multithreaded program in accessing mutually exclusive shared resources are dynamically monitored and detected, according to embodiments of the present invention.

FIG. 7 is a flowchart of an exemplary process, in which deadlocks among threads in a multithreaded program in accessing mutually exclusive shared resources are dynamically monitored and detected, according to embodiments of the present invention. Resource operations performed by threads with respect to the mutually exclusive shared resources 120 are monitored at act 710. Based on observed resource operations, the thread descriptors are updated at act 720 and the resource descriptors are updated at act 730.

As discussed earlier, the deadlock detection mechanism 140 is activated only when it is appropriate. For example, deadlocks may occur only when there is at least one request. One exemplary strategy to determine when the resource monitoring mechanism may activate the deadlock detection is whenever there is a request operation. This is depicted in FIG. 7. If the observed resource operation is not a request operation, there is no need to consider whether the deadlock detection mechanism 140 is to be activated. In this case, the resource operation monitoring mechanism 130 returns to act 710 to continue monitoring the resource operations. If the observed resource operation is a request operation, determined at act 740, the resource operation monitoring mechanism 130 further determines whether the deadlock detection is to be activated.

Different activation criteria may be implemented to control the activation. For example, the deadlock detection mechanism 140 may be activated every 3 seconds whenever there are threads requesting shared resources. This may be controlled by a timer. A different criterion may depend on how frequent the threads issue shared resource requests. For instance, when the frequency of request operations is high, the deadlock detection may be activated more often. Depending on the activation strategy adopted, the resource operation monitoring mechanism 130 determines, at act 750, whether it is appropriate to activate the deadlock detection whenever there is a request operation. If it is not an appropriate time to activate the deadlock detection mechanism 140, the resource monitoring mechanism 130 returns to act 710 to continue to monitor the resource operations. Otherwise, the deadlock detection mechanism 140 is activated and performs deadlock detection at act 760.

Figure 8:
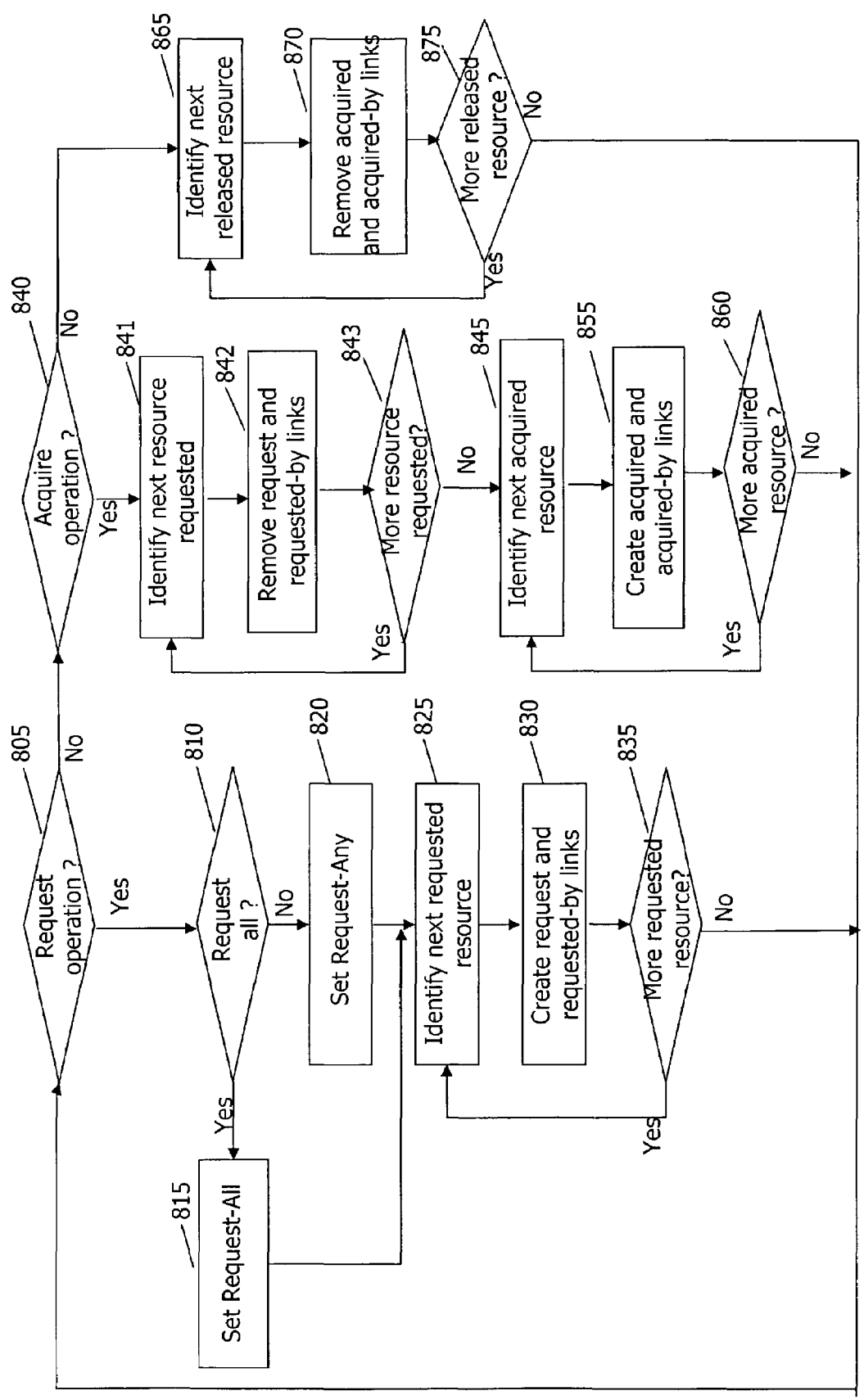
FIG. 8 is a flowchart of an exemplary process, in which thread and resource descriptors are updated based on observed resource operations, according to embodiments of the present invention.

FIG. 8 is a flowchart of an exemplary process, in which the resource descriptors 340 and the thread descriptors 350 are updated based on observed resource operations, according to embodiments of the present invention. When a resource operation is observed by the operation observation mechanism 310, it determines the type of the observed resource operation at acts 805 and 840. Based on the resource operation, the operation observation mechanism 310 may activate the thread descriptor update mechanism 330 and the resource descriptor update mechanism 320 to update corresponding thread descriptors 350 and resource descriptors 340.

When an observed resource operation is a request operation, it is further determined, at act 810, whether the observed resource operation is a request-any or a request-all operation. If it is a request-all operation, a flag is set, at act 815, to indicate that the request operation is a request-all operation. Otherwise, the flag is set, at act 820, to signal a request-any operation. The flag is so set that it leads to different processing during deadlock detection. This will be discussed in detail with reference to FIG. 11.

After the flag is set, a pair of a request link pointing to the requested resource descriptor and a request-by link pointing to the requesting thread descriptor are created, in the requesting thread descriptor and the requested resource descriptor respectively, for each of the requested shared resources. A requested shared resource is first identified at act 825. For such an identified requested shared resource, the pair of a request link and a request-by link are created, at act 830, in both the thread descriptor, corresponding to and representing the requesting thread, and the resource descriptor, corresponding to and representing the identified requested shared resource, respectively. The process of creating such pairs of request and request-by links continues until all the requested shared resources are enumerated, determined at act 835.

When the resource operation is an acquire operation, determined at act 840, for each resource that the thread has previously requested, a pair of a request link pointing to the requested resource descriptor and a requested-by link pointing to the acquiring thread descriptor may be first removed from both the thread descriptor, representing the acquiring thread, and the resource descriptor, representing the resource the acquiring thread has previously requested, respectively. Such a pair of the request link and the requested-by link may have been created when the thread previously requested the shared resource(s) and had to wait to acquire the requested resource(s) until the requested resource(s) became available.

Subsequently, for each acquired resource, a pair of an acquired link pointing to the acquired resource descriptor and an acquired-by link pointing to the acquiring thread descriptor are created in both the thread descriptor, representing the acquiring thread, and the resource descriptor, representing the acquired resource, respectively.

A shared resource requested is first identified at act 841. The pair of the corresponding request link and the requested-by link is removed, at act 842, from the acquiring thread descriptor and the requested resource descriptor, respectively. The process of removing such pairs of links for each resource the thread requested continues until, determined at act 843, the descriptors corresponding to each and every requested resource are updated.

A shared resource acquired is first identified at act 845. A new pair of an acquired link pointing to the acquired resource descriptor and an acquired-by link pointing to the acquiring thread descriptor are then created, at act 855, in the thread descriptor corresponding to and representing the acquiring thread and in the resource descriptor, corresponding to and representing the acquired resource, respectively. The process of creating such pairs of acquired link and acquired-by link continues until, determined at act 860, the descriptors corresponding to each and every acquired resource are updated.

When the observed resource operation is neither a request nor an acquire operation, it is a release operation, determined at act 840. For each released shared resource, identified at act 865, the pair of an acquired link pointing to the released resource descriptor and an acquired-by link pointing to the releasing thread descriptor are removed, at act 870, from the thread descriptor corresponding to and representing the releasing thread and the resource descriptor corresponding to and representing the released resource. The process continues until, determined at act 875, the resource descriptors associated with each and every released resource are updated.

Figure 9:
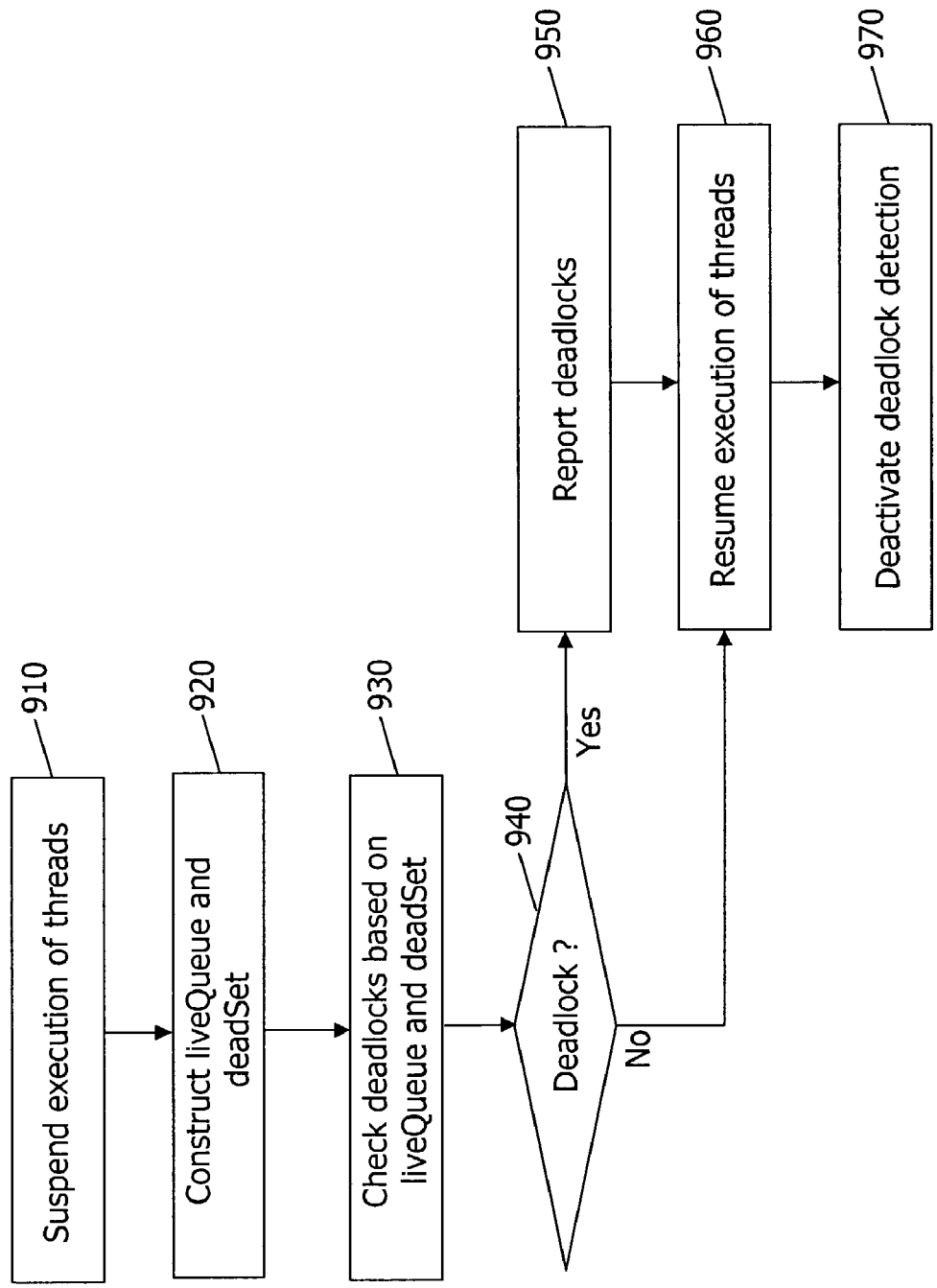
FIG. 9 is a flowchart of an exemplary process, in which deadlocks are detected based on information contained in thread and resource descriptors, according to embodiments of the present invention.

FIG. 9 is a flowchart of an exemplary process, in which deadlocks are detected based on information contained in thread descriptors and resource descriptors, according to embodiments of the present invention. The deadlock detection mechanism 140 may be activated when a request operation is observed. After the deadlock detection mechanism 140 is invoked, it may temporarily suspend, at act 910, the execution of all threads in the multithreaded program 110 during deadlock detection. To enable deadlock detection, the liveQueue 620 and the deadSet 630 are constructed, at act 920, according to the information contained in the resource descriptors 340 and the thread descriptors 350. Details about constructing the liveQueue 620 and the deadSet 630 are described with reference to FIG. 10.

Based on the constructed liveQueue 620 and the deadSet 630, the deadlock detector 640 checks, at act 930, whether deadlocks exist. Details about how to detect deadlocks based on liveQueue 620 and the deadSet 630 are described with reference to FIG. 11. If deadlocks exist, determined at act 940, the deadlock reporting mechanism is invoked to report, at act 950, the detected deadlocks. Details about reporting deadlocks are described with reference to FIG. 12. The deadlock detection mechanism 140 then resumes, at act 960, the execution of the threads before it deactivates itself at act 970.

Figure 10:
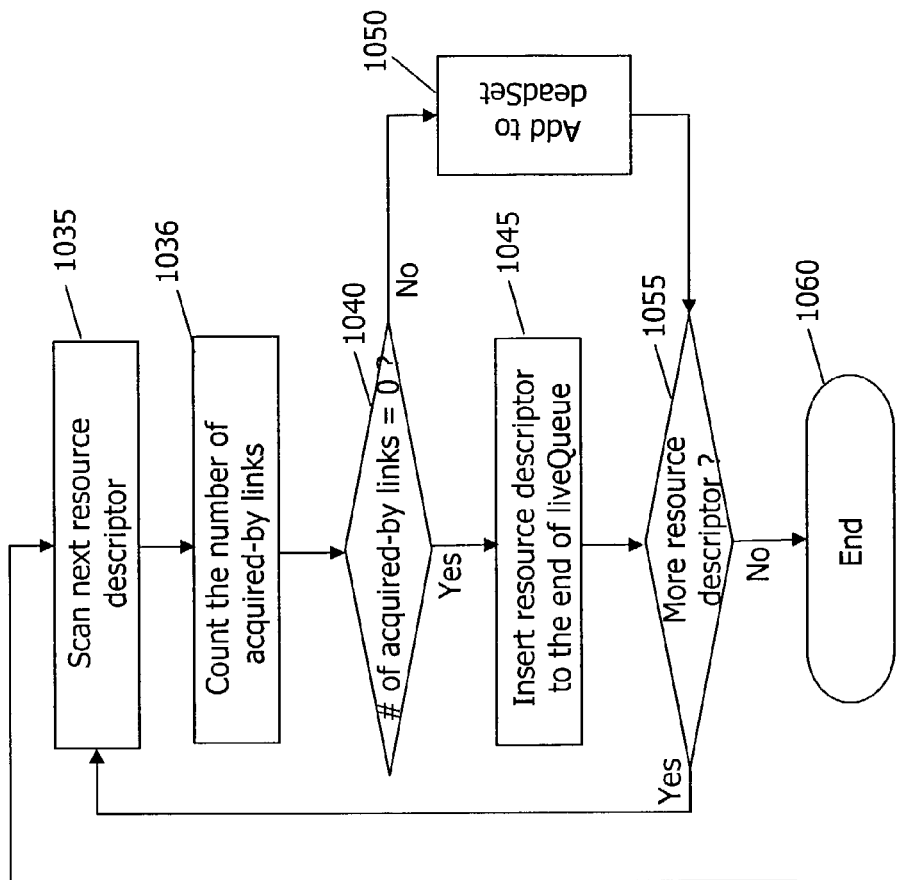
FIG. 10 is a flowchart of an exemplary process, in which a live queue and a dead set are constructed based on thread and resource descriptors for deadlock detection purposes, according to embodiments of the present invention.
Figure 10:
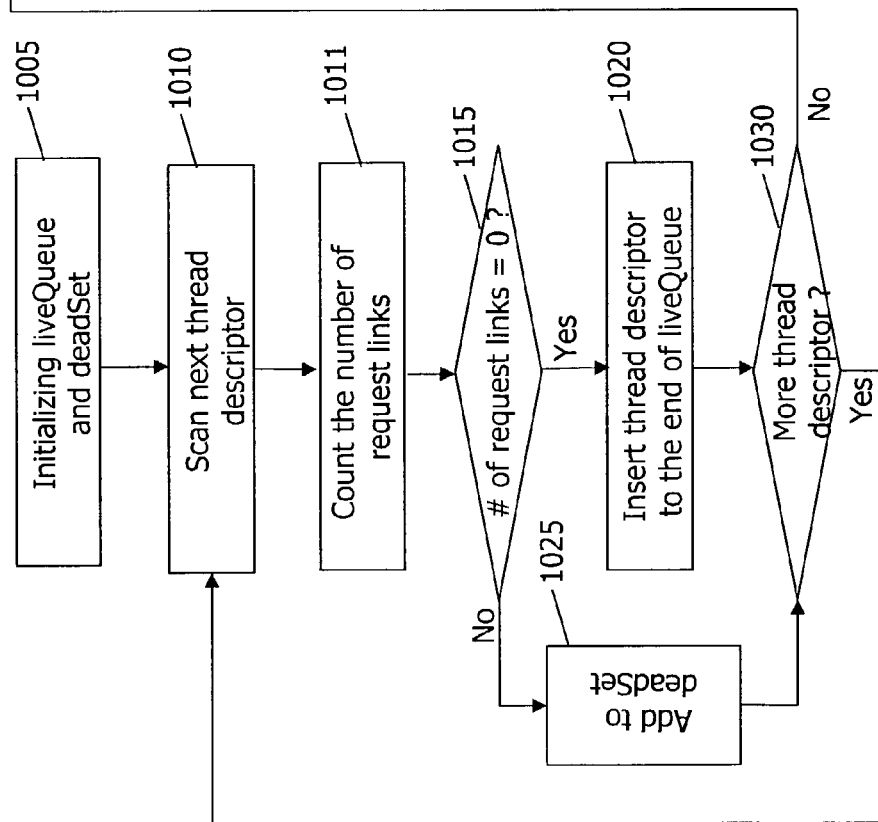

FIG. 10 is a flowchart of an exemplary process, in which the liveQueue 620 and the deadSet 630 are constructed for deadlock detection purposes, based on both thread descriptors and resource descriptors, according to embodiments of the present invention. The liveQueue 620 and the deadSet 630 are first initialized at act 1005. Between acts 1010 and 1030, the construction mechanism 610 scans each of the thread descriptors, analyzes the information contained in each thread descriptor and generates information in the liveQueue 620 and the deadSet 630 accordingly.

For each of the thread descriptors, the construction mechanism 610 first scans, at act 1010, the content of the thread descriptor. The number of request links in the thread descriptor is counted at act 1011. If the number of request links of the thread descriptor is not zero, determined at act 1015, the construction mechanism 610 adds, at act 1025, the thread descriptor to the deadSet 630. Otherwise, the construction mechanism 610 inserts, at act 1020, the thread descriptor to the end of the liveQueue 620. The process continues until, determined at act 1030, all the thread descriptors are enumerated.

After all the thread descriptors are processed, the construction mechanism 610 processes each and every resource descriptor and generates information in the liveQueue 620 and the deadSet 630 according to the content of the resource descriptors. For each of the resource descriptors, the construction mechanism 610 first scans, at act 1035, the content of the resource descriptor. The number of acquired-by links in the resource descriptor is counted at act 1036. If the number of acquired-by links of the resource descriptor is not zero, determined at act 1040, the construction mechanism 610 adds, at act 1050, the resource descriptor to the deadSet 630. Otherwise, the construction mechanism 610 inserts, at act 1045, the resource descriptor to the end of the liveQueue 620. The process continues until, determined at act 1055, all of the resource descriptors are enumerated.

Figure 11:
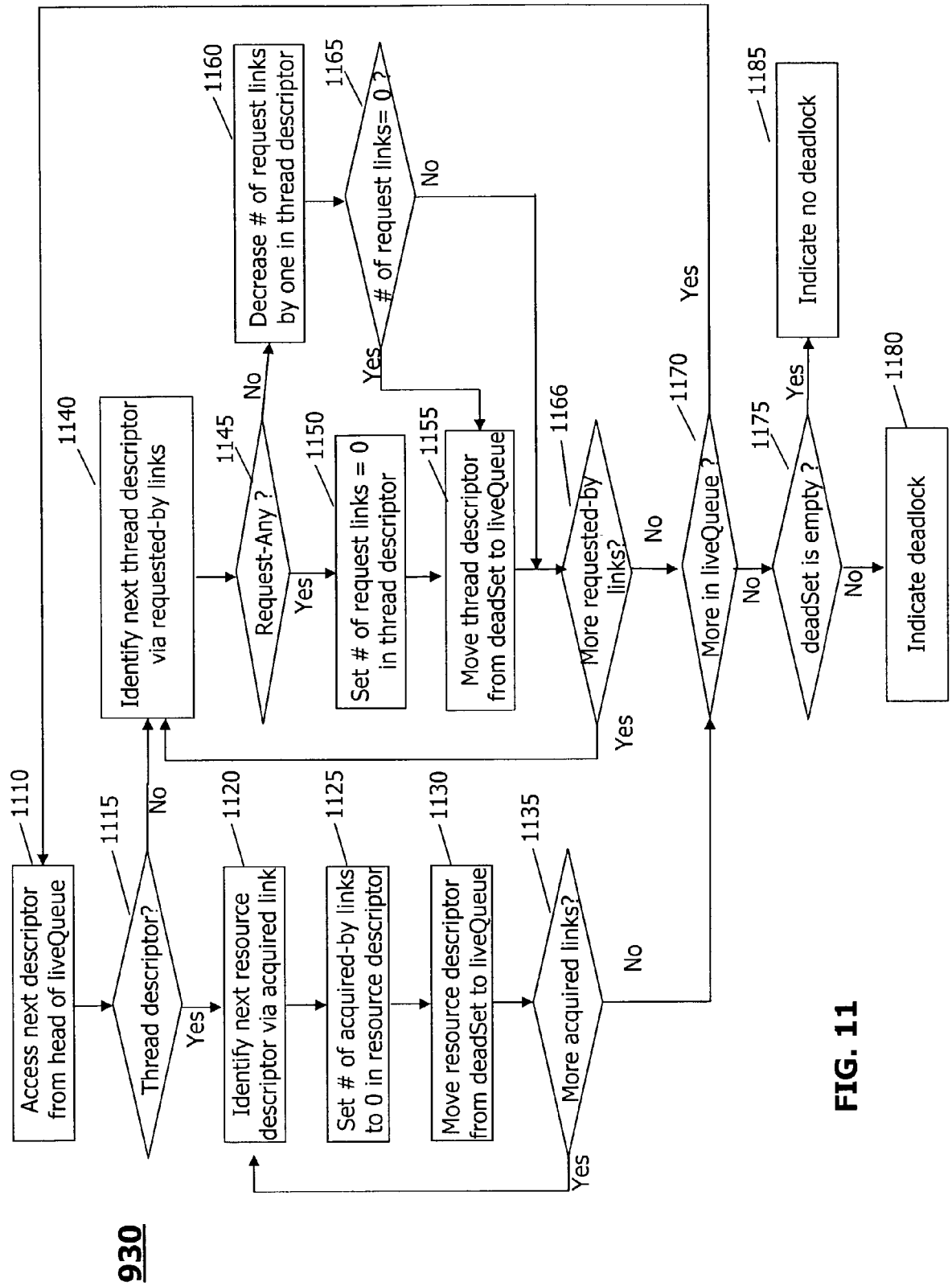
FIG. 11 is a flowchart of an exemplary process, in which deadlocks are detected based on information in a live queue and a dead set, according to embodiments of the present invention.

FIG. 11 is a flowchart of an exemplary process, in which deadlocks are detected based on information in the liveQueue 620 and the deadSet 630, according to embodiments of the present invention. The deadlock detection processing starts with the liveQueue 620. Starting from the head of the liveQueue 620, the deadlock detector 640 accesses, at act 1110, next unprocessed descriptor, which may be a thread descriptor or a resource descriptor. If next descriptor from the head of the liveQueue 620 is a thread descriptor, determined at act 1115, the deadlock detector 640 first identifies, at act 1120, a resource descriptor linked from the thread descriptor via an acquired link.

For such identified resource descriptor, the deadlock detector 640 sets, at act 1125, its number of acquired-by links (in the resource descriptor) to zero. Such modified resource descriptor is then moved, at act 1130, from the deadSet 630 to the end of the liveQueue 620. The processing between acts 1120 and 1130 continues until, determined at act 1135, all the acquired links in the current thread descriptor are enumerated. At this point, the deadlock detector 640 determines, at act 1170, whether there are more descriptors remaining in the liveQueue 620. If there are more descriptors remaining in the liveQueue 620, the processing returns to act 1110 to process the next descriptor.

If next descriptor from the head of the liveQueue 620 is a resource descriptor, determined at act 1115, the deadlock detector 640 first identifies, at act 1140, a thread descriptor linked from the resource descriptor via a requested-by link. If the request operation associated with the requested-by link is a request-any operation, determined at act 1145, the deadlock detector 640 sets, at act 1150, the number of request links in the linked thread descriptor to zero before moving, at act 1155, the thread descriptor from the deadSet 630 to the end of the liveQueue 620.

If the request operation associated with the requested-by link (identified at act 1140) is a request-all operation (determined at act 1145), the deadlock detector 640 decreases, at act 1160, the number of request links in the linked thread descriptor by one. If such decrement yields a zero, determined at act 1165, the deadlock detector 640, moves, at act 1155, the thread descriptor from the deadSet 630 to the end of the liveQueue 620. The processing between acts 1140 and 1165 continues until, determined at act 1166, all the requested-by links in the current resource descriptor are enumerated. The deadlock detector 640 then continues to determine, at act 1170, whether there are more descriptors in the liveQueue 620. If there are, the processing returns to act 1110 to handle the next descriptor.

When all the descriptors in the liveQueue 620 are processed, determined at act 1170, the deadlock detector 640 completed deadlock detection processing. At this point, if the deadSet 630 is not empty, determined at act 1175, deadlock situations are detected. In this case, the deadlock detector 640 indicates, at act 1180, that deadlocks are detected. Otherwise, the deadlock detector 640 indicates, at act 1185, that there are no deadlocks detected.

Figure 12:
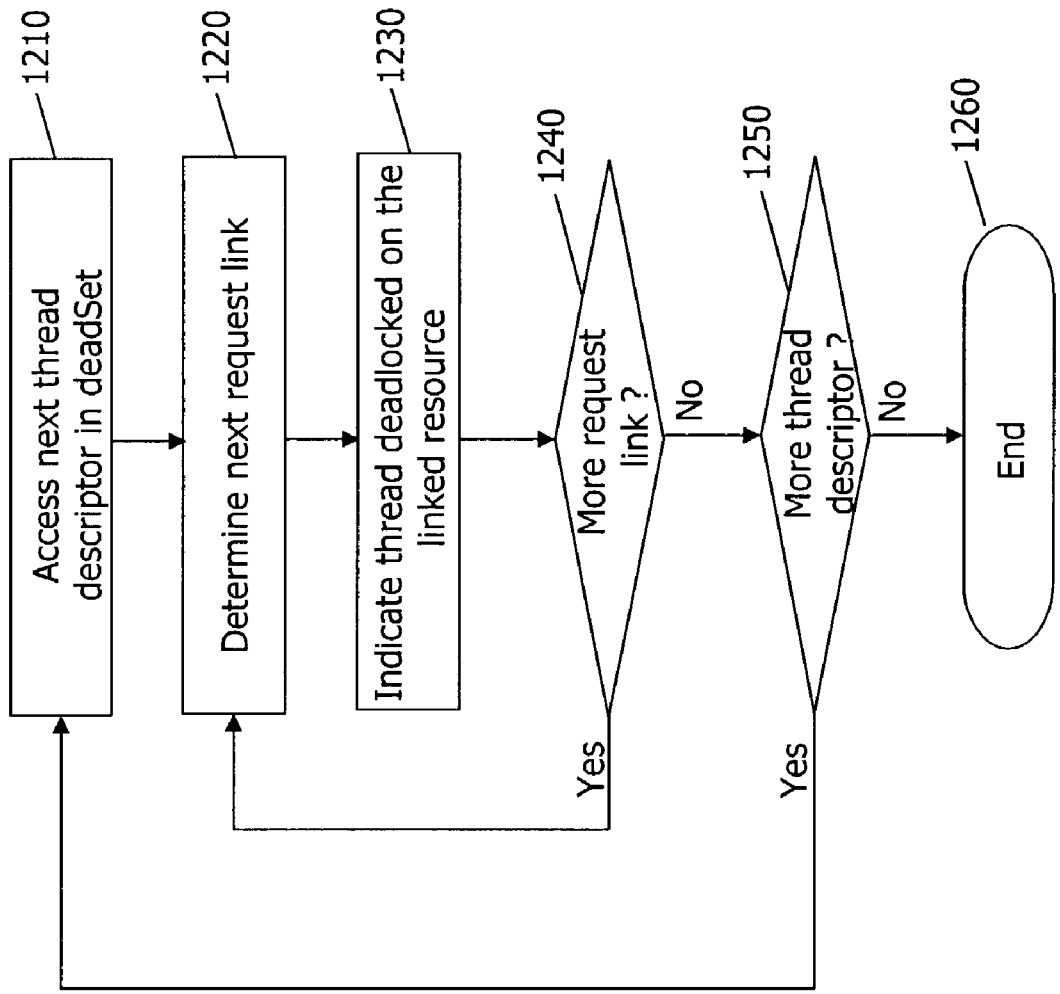
FIG. 12 is a flowchart of an exemplary process, in which detected deadlocks are reported, according to embodiments of the present invention.

FIG. 12 is a flowchart of an exemplary process, in which the deadlock reporting mechanism 650 reports detected deadlocks, according to embodiments of the present invention. As described above, at the end of deadlock detection, the thread descriptor(s), if any, remaining in the deadSet 630 represent the threads that are deadlocked. To report which thread is deadlocked on which shared resource, the deadlock reporting mechanism 650 starts the processing with the deadSet 630. The deadlock reporting mechanism 650 first accesses, at act 1210, next thread descriptor in the deadSet 630. To identify on which shared resource(s) the thread is deadlocked, the deadlock reporting mechanism 650 determines, at act 1220, such resource(s) via the request links in the thread descriptor. For each of such identified shared resources, the deadlock reporting mechanism 650 reports, at act 1230, that the underlying thread is deadlocked on the identified shared resource. The reporting for the particular thread continues until, determined at act 1240, all the request links are reported. The deadlock reporting mechanism 650 then continues to report next deadlocked thread until, determined at act 1250, all the deadlocked threads have been reported. The reporting process ends at act 1260.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A computer implemented method to be performed by a processing system, the method comprising:
   monitoring relationships between threads of a multithreaded program and mutually exclusive shared resources, the relationships created by resource operations performed by the threads, the resource operations related to at least one of the mutually exclusive shared resources;
   generating at least one thread descriptor and at least one resource descriptor, based on the monitored relationships between the threads and the mutually exclusive shared resources, wherein the at least one thread descriptor corresponds to a thread in the multithreaded program and the at least one resource descriptor corresponds to a mutually exclusive shared resource; and
   detecting deadlocks based on the relationships between the threads and the mutually exclusive shared resources, wherein said detecting deadlocks comprises:
   constructing a live queue and a dead set based on the at least one thread descriptor and the at least one resource descriptor; and
   checking deadlocks based on the live queue and the dead set.

2. The method according to claim 1, wherein the operation of monitoring relationships comprises monitoring relationships created by at least one resource operation from the group consisting of:
   a request operation;
   an acquire operation; and
   a release operation.

3. The method acording to claim 1, wherein the the operation of monitoring relationships comprises monitoring relationships created by at least one resource operation from the group consisting of:
   a request-any operation; and
   a request-all operation.

4. The method according to claim 1, wherein the operation of generating at least one thread descriptor comprises generating a thread descriptor to include at least one item from the group consisting of:
   information specifying an underlying thread;
   zero or more request links, each pointing to a corresponding resource descriptor related to a resource requested by the underlying thread; and
   zero or more acquired links, each pointing to a corresponding resource descriptor related to a resource acquired by the underlying thread.

5. The method according to claim 1, wherein the operation of generating at least one resource descriptor comprises generating a resource descriptor to include at least one item from the group consisting of:
   information describing a feature of a corresponding resource;
   a requested-by link pointing to a thread descriptor describing a thread that requested the corresponding resource; and
   an acquired-by link pointing to a thread descriptor describing a thread that acquired the corresponding resource.

6. The method according to claim 1, wherein the operation of generating at least one thread descriptor and at least one resource descriptor comprises:
   if a thread requests a shared resource, (a) creating a request link for the requested shared resource in the thread descriptor of the thread and (b) creating a requested-by link in the resource descriptor corresponding to the resource requested by the thread;
   if the thread acquires a shared resource, (a) creating an acquired link for the acquired shared resource in the thread descriptor of the thread, (b) creating an acquired-by link in the resource descriptor corresponding to the acquired shared resource, and (c) removing a request link in the thread descriptor and an associated requested-by link in the resource descriptor; and if the thread releases a shared resource, (a) removing an acquired link for the released shared resource in the thread descriptor and (b) removing an acquired-by link in the resource descriptor corresponding to the released shared resource.

7. The method according to claim 1, wherein said constructing comprises:
   initializing the live queue and the dead set;
   for each thread descriptor corresponding to a thread:
      adding the thread descriptor to the dead set if the number of request links in the thread descriptor is not zero, and
      adding the thread descriptor to the live queue if the number of request links in the thread descriptor is zero;
   for each resource descriptor corresponding to a shared resource:
      adding the resource descriptor to the dead set if the number of acquired-by links in the resource descriptor is not zero, and
      adding the resource descriptor to the live queue if the number of acquired-by links in the resource descriptor is zero.

8. The method according to claim 7, wherein the live queue has a head and an end, and the operation of checking deadlocks comprises:
   for each descriptor in the live queue, starting from the head of the live queue:
   if the descriptor is a thread descriptor;
      for each resource descriptor linked via an acquired link in the thread descriptor;
         setting the number of acquired-by links in the resource descriptor to zero, and
         moving the resource descriptor from the dead set to the end of the live queue;
   if the descriptor is a resource descriptor;
      for each thread descriptor linked via a requested-by link in the resource descriptor;
         if the requested-by link corresponds to a request-any operation;
            setting the number of request links to zero in the thread descriptor, and
            moving the thread descriptor from the dead set to the end of the live queue;
         if the requested-by link corresponds to a request-all operation;
            decreasing the number of request links by one in the thread descriptor to generate an updated number of request links; and
            moving the thread descriptor from the dead set to the end of the live queue when the updated number of request links reaches zero; and
   indicating a deadlock situation if the dead set is not empty after all of the descriptors in the live queue are processed.

9. The method according to claim 1, further comprising reporting a deadlock in response to detecting a deadlock.

10. The method according to claim 1, further comprising:
   reporting threads as deadlocked in response to detecting a deadlock, wherein the operation of reporting threads as deadlocked comprises:
   for each thread descriptor in the dead set:
      for each request link in the thread descriptor pointing to a resource descriptor corresponding to a shared resource, indicating the thread being deadlocked on the shared resource.

11. An apparatus, comprising:
   a tangible machine-accessible medium; and
   instructions in the machine-accessible medium, wherein the instructions, when executed by a processing system, cause the processing system to perform operations comprising:
   monitoring relationships between threads of a multithreaded program and mutually exclusive shared resources, the relationships created by resource operations performed by one or more of the threads, the resource operations related to at least one of the mutually exclusive shared resources;
   generating at least one thread descriptor and at least one resource descriptor, based on the monitored relationships between the threads and the mutually exclusive shared resources, wherein the at least one thread descriptor corresponds to a thread in the multithreaded program and the at least one resource descriptor corresponds to a mutually exclusive shared resource; and
   detecting deadlocks based on the relationships between the threads and the mutually exclusive shared resources, wherein the operation of detecting deadlocks comprises:
   constructing a live queue and a dead set based on the at least one thread descriptor and the at least one resource descriptor; and
   checking deadlocks based on the live queue and the dead set.

12. An apparatus according to claim 11, wherein the instructions, when executed, cause the processing system to monitor relationships created by at least one resource operation from the group consisting of:
   a request operation;
   an acquire operation; and
   a release operation.

13. An apparatus according to claim 11, wherein the instructions, when executed, cause the processing system to monitor relationships created by at least one resource operation from the group consisting of:
   a request-any operation; and
   a request-all operation.

14. An apparatus according to claim 11, wherein the instructions, when executed, create thread descriptors that include at least one item from the group consisting of:
   information to identify an underlying thread;
   zero or more request links, each request link to identify a corresponding resource descriptor related to a resource requested by the underlying thread; and
   zero or more acquired links, each acquired link to identify a corresponding resource descriptor related to a resource acquired by the underlying thread.

15. An apparatus according to claim 11, wherein the instructions, when executed, create resource descriptors that include at least one item from the group consisting of:
   information describing a feature of a corresponding resource;
   a requested-by link to identify a thread descriptor describing a thread that requested the corresponding resource; and
   an acquired-by link to identify a thread descriptor describing a thread that acquired the corresponding resource.

16. An apparatus according to claim 11, comprising instructions which, when executed, perform operations comprising:
   if a thread requests a shared resource, (a) creating a request link for the requested shared resource in the thread descriptor for the thread and (b) creating a requested-by link in the resource descriptor for the resource requested by the thread;

if the thread acquires a shared resource, (a) removing a request link from the thread descriptor and removing a requested-by link from the resource descriptor, (b) creating an acquired link for the acquired shared resource in the thread descriptor for the thread, and (c) creating an acquired-by link in the resource descriptor for the acquired shared resource; and if the thread releases a shared resource, (a) removing an acquired link from the thread descriptor and (b) removing an acquired-by link from the resource descriptor.

17. An apparatus according to claim 11, wherein the instructions to construct a live queue and a dead set comprise instructions which, when executed, perform operations comprising:

initializing the live queue and the dead set;

for each thread descriptor corresponding to a thread:
adding the thread descriptor to the dead set if the number of request links in the thread descriptor is not zero, and
adding the thread descriptor to the live queue if the number of request links in the thread descriptor is zero; and for each resource descriptor corresponding to a shared resource:
adding the resource descriptor to the dead set if the number of acquired-by links in the resource descriptor is not zero, and
adding the resource descriptor to the live queue if the number of acquired-by links in the resource descriptor is zero.

18. An apparatus according to claim 17, wherein the live queue has a head and an end, and wherein the instructions to check deadlocks comprise instructions which, when executed, perform operations comprising:

for each descriptor in the live queue, starting from the head of the live queue:
if the descriptor is a thread descriptor:
for each resource descriptor linked via an acquired link in the thread descriptor, (a) setting the number of acquired-by links in the resource descriptor to zero, and (b) moving the resource descriptor from the dead set to the end of the live queue;
if the descriptor is a resource descriptor:
for each thread descriptor linked via a requested-by link in the resource descriptor:
if the requested-by link corresponds to a request-any operation, (a) setting the number of request links to zero in the thread descriptor, and (b) moving the thread descriptor from the dead set to the end of the live queue; and
if the requested-by link corresponds to a request-all operation, (a) decreasing the number of request links by one in the thread descriptor to generate an updated number of request links, and (b) moving the thread descriptor from the dead set to the end of the live queue when the updated number of request links reaches zero; and determining that deadlock exists if the dead set is not empty after all of the descriptors in the live queue have been processed.

19. An apparatus according to claim 11, further comprising instructions which, when executed, perform operations comprising:

reporting a deadlock in response to detecting a deadlock.

20. An apparatus according to claim 11, further comprising instructions which, when executed, perform operations comprising:

reporting threads as deadlocked in response to detecting a deadlock, wherein the operation of reporting threads as deadlocked comprises:
for each thread descriptor in the dead set:
for each request link that points to a resource descriptor for a shared resource, reporting the thread as deadlocked on the shared resource.

21. A processing system, comprising:

a processor;

a machine-accessible medium responsive to the processor; and instructions in the machine-accessible medium, wherein the instructions, when executed by the processor, cause the processing system to perform operations comprising:

monitoring relationships between threads of a multithreaded program and mutually exclusive shared resources, the relationships created by resource operations performed by one or more of the threads, the resource operations related to at least one of the mutually exclusive shared resources;

generating at least one thread descriptor and at least one resource descriptor, based on the monitored relationships between the threads and the mutually exclusive shared resources, wherein the at least one thread descriptor corresponds to a thread in the multithreaded program and the at least one resource descriptor corresponds to a mutually exclusive shared resource; and detecting deadlocks based on the relationships between the threads and the mutually exclusive shared resources, wherein the operation of detecting deadlocks comprises:

constructing a live queue and a dead set based on the at least one thread descriptor and the at least one resource descriptor; and checking deadlocks based on the live queue and the dead set.

22. A processing system according to claim 21, wherein the instructions, when executed, cause the processing system to monitor relationships created by at least one resource operation from the group consisting of:

a request operation;

an acquire operation; and a release operation.

23. A processing system according to claim 21, wherein the instructions, when executed, cause the processing system to monitor relationships created by at least one resource operation from the group consisting of:

a request-any operation; and a request-all operation.

24. A processing system according to claim 21, wherein the instructions, when executed, create thread descriptors that include at least one item from the group consisting of:

information to identify an underlying thread;

zero or more request links, each request link to identify a corresponding resource descriptor related to a resource requested by the underlying thread; and zero or more acquired links, each acquired link to identify a corresponding resource descriptor related to a resource acquired by the underlying thread.

25. A processing system according to claim 21, wherein the instructions, when executed, create resource descriptors that include at least one item from the group consisting of:

information describing a feature of a corresponding resource;

a requested-by link to identify a thread descriptor describing a thread that requested the corresponding resource; and an acquired-by link to identify a thread descriptor describing a thread that acquired the corresponding resource.

26. A processing system according to claim 21, wherein the instructions, when executed, perform operations comprising:

if a thread requests a shared resource, (a) creating a request link for the requested shared resource in the thread descriptor for the thread and (b) creating a requested-by link in the resource descriptor for the resource requested by the thread;

if the thread acquires a shared resource, (a) removing a request link from the thread descriptor and removing a requested-by link from the resource descriptor, (b) creating an acquired link for the acquired shared resource in the thread descriptor for the thread, and (c) creating an acquired-by link in the resource descriptor for the acquired shared resource; and if the thread releases a shared resource, (a) removing an acquired link from the thread descriptor and (b) removing an acquired-by link from the resource descriptor.

27. A processing system according to claim 21, wherein the instructions to construct a live queue and a dead set comprise instructions which, when executed, perform operations comprising:

initializing the live queue and the dead set;

for each thread descriptor corresponding to a thread:
adding the thread descriptor to the dead set if the number of request links in the thread descriptor is not zero, and
adding the thread descriptor to the live queue if the number of request links in the thread descriptor is zero; and for each resource descriptor corresponding to a shared resource:
adding the resource descriptor to the dead set if the number of acquired-by links in the resource descriptor is not zero, and
adding the resource descriptor to the live queue if the number of acquired-by links in the resource descriptor is zero.

28. A processing system according to claim 27, wherein the live queue has a head and an end, and wherein the instructions to check deadlocks comprise instructions which, when executed, perform operations comprising:

for each descriptor in the live queue, starting from the head of the live queue:
if the descriptor is a thread descriptor:
for each resource descriptor linked via an acquired link in the thread descriptor, (a) setting the number of acquired-by links in the resource descriptor to zero, and (b) moving the resource descriptor from the dead set to the end of the live queue;
if the descriptor is a resource descriptor:
for each thread descriptor linked via a requested-by link in the resource descriptor:
if the requested-by link corresponds to a request-any operation, (a) setting the number of request links to zero in the thread descriptor, and (b) moving the thread descriptor from the dead set to the end of the live queue; and
if the requested-by link corresponds to a request-all operation, (a) decreasing the number of request links by one in the thread descriptor to generate an updated number of request links, and (b) moving the thread descriptor from the dead set to the end of the live queue when the updated number of request links reaches zero; and determining that deadlock exists if the dead set is not empty after all of the descriptors in the live queue have been processed.

29. A processing system according to claim 21, wherein the instructions, when executed, perform operations comprising:

reporting a deadlock in response to detecting a deadlock.

30. A processing system according to claim 21, wherein the instructions, when executed, perform operations comprising:

reporting threads as deadlocked in response to detecting a deadlock, wherein the operation of reporting threads as deadlocked comprises:

for each thread descriptor in the dead set:
for each request link that points to a resource descriptor for a shared resource, reporting the thread as deadlocked on the shared resource.

* * * * *